(12) United States Patent
Rossi

(10) Patent No.: US 8,707,804 B2
(45) Date of Patent: Apr. 29, 2014

(54) DYNAMIC LOAD BENCH

(75) Inventor: Rinaldo Jean Costantino Rossi, Paris (FR)

(73) Assignee: MBDA France, Paris (FR)

( * ) Notice: Subject to any disclaimer, the term of this patent is extended or adjusted under 35 U.S.C. 154(b) by 106 days.

(21) Appl. No.: 13/375,444

(22) PCT Filed: Jun. 8, 2010

(86) PCT No.: PCT/FR2010/000416
§ 371 (c)(1),
(2), (4) Date: Nov. 30, 2011

(87) PCT Pub. No.: WO2010/142866
PCT Pub. Date: Dec. 16, 2010

(65) Prior Publication Data
US 2012/0067140 A1    Mar. 22, 2012

(30) Foreign Application Priority Data
Jun. 12, 2009    (FR) .................................... 09 02860

(51) Int. Cl.
*G01L 5/28*    (2006.01)
*G01L 3/14*    (2006.01)

(52) U.S. Cl.
USPC ........................ 73/862.321; 73/121

(58) Field of Classification Search
CPC .................................................... G01M 13/025
USPC .......................................... 73/862.321, 121
See application file for complete search history.

(56) References Cited

U.S. PATENT DOCUMENTS

| 4,711,124 A * | 12/1987 | Cagle ............................... 73/162 |
| 2004/0255698 A1 * | 12/2004 | Beaman et al. ............ 73/862.49 |
| 2006/0070457 A1 | 4/2006 | De Lair |

FOREIGN PATENT DOCUMENTS

| DE | 42 16 973 A1 | 11/1993 |
| DE | 10 2004 021645 A1 | 12/2005 |
| EP | 0 239 264 A2 | 9/1987 |
| FR | 1 600 552 A | 7/1970 |

OTHER PUBLICATIONS

International Search Report completed Sep. 16, 2010 and mailed Sep. 23, 2010 from corresponding International Application No. PCT/FR2010/000416 filed Jun. 8, 2010 (2 pages).
Written Opinion completed Sep. 16, 2010 and mailed Sep. 23, 2010 from corresponding International Application No. PCT/FR2010/000416 filed Jun. 8, 2010 (13 pages).

* cited by examiner

*Primary Examiner* — Lisa Caputo
*Assistant Examiner* — Brandi N Hopkins
(74) *Attorney, Agent, or Firm* — Klein, O'Neill & Singh, LLP

(57) ABSTRACT

The present disclosure relates to a load bench for applying on the rotary shaft of a device to be tested, such as an actuator or the like, radial loads and variable torques provided by controlled reproduction means. Advantageously, the controlled reproduction means include two identical reproduction modules arranged in parallel and symmetrically relative to the rotary shaft to be tested, each of which comprises a torque motor, a torsion rod, and a connecting rod-crank connection connecting the torsion rod to the rotary shaft of the mechanism to be tested.

20 Claims, 3 Drawing Sheets

DYNAMIC LOAD BENCH

CROSS-REFERENCE TO RELATED APPLICATIONS

This is a national phase application under 35 U.S.C. §371 of PCT Application No. PCT/FR2010/000416, filed Jun. 8, 2010, which claims the benefit of French application Ser. No. 09/02860 filed Jun. 12, 2009, the contents of each of which are expressly incorporated herein by reference.

FIELD OF ART

The present method, system and device relate to a dynamic load bench intended for applying, on the rotary shaft of a device to be tested, such as an actuator or the like, radial loads and variable torques, so as to reproduce, as faithfully as possible, the mechanical biases or constraints submitted by the actuator upon actual conditions of use.

BACKGROUND

In a preferred, although not exclusive, application, the output shaft of the rotary bench carries, integrally in rotation, an aerodynamic surface of an aircraft, such as a control surface of a missile or another device circulating at high speed in a fluidic medium, and it is then subjected to evolutive and high stresses (radial loads) and hinge moments (torques), generated by the aerodynamic forces applied on the control surface according to the deflection angle of the latter.

Thus, the aim of the dynamic load bench of the present method, system and device is to reproduce both radial loads as well as variable torques, depending on the rotation angle adopted by the output shaft of the rotary bench, being representative of the deflection carried out by the control surface. And the value of these stresses and moments will be able to be modulated as a function of time so as to represent the different flight points of the missile (slow and/or quick variations of the speed, trajectory and altitude changes, . . . ) and come as close as possible to the actual conditions being met, that is, aerodynamic operational loads undergone by the actuator so as to, subsequently, optimize the design thereof.

Dynamic load benches for such actuators are already known, being based on controlled reproduction means of the torque only, from a torsional rod or from a torque generator.

In the first case, the torsional rod of the bench reproducing means is linked, on the one hand, directly to the shaft of the rotary bench to be tested and, on the other hand, is restrained so that, when the actuator angularly clears, it generates a torque being proportional to the rotation angle of the deflection. Although having a very basic design, such torsional rod means apply return torques that do not allow to generate destabilizing and/or evolutive loads as a function of the deflection of the control surface. Furthermore, they are too limited and do not allow to validate reliably the performance of the actuators in actual flight conditions, so that, through a lack of clear and accurate data, the torsional rod reproduction means are over-specified so as to keep margins.

In the second case, the torque generator of the reproduction means is directly coupled to the actuator and is defined, as a result of required dynamic performance, by a hydraulic torque motor. If high torques can be thereby tested, on the other hand, the relative movements occurring between the torque motor and the actuator generate problems as a result of their inertia and their rigid link as, when the shaft of one of them rotates, the other tends to counteract, so that shocks could occur up to the destruction of the equipment. This could be amplified by the hydraulic engines being significantly powerful.

In addition to only applying the torque on the rotary shaft to be tested (another specific bench being required for radial loads), these dynamic load benches do not often meet all the desired expectations and requirements such as:

having a lower apparent inertia and a nil coupling play so as not to disturb the actuator to be tested; ideally, behave on a dynamic standpoint, as a mere torque;

having available a high pass band of the torque slaving loop, at least of double that of the actuator to be tested so as to reproduce the instructed torque profile, without any significant delay;

having available a well higher speed and acceleration saturation relative to that of the actuator;

tolerating functional misalignments between the actuator and the bench for an easy implementation, involving some flexibility of the link often incompatible with a high pass band of the torque loop;

ensuring an efficient management of the applied torques so as to avoid any overload, overspeed and accidental abutment, that could prove to be damaging, and this even in the case when the actuator should become defective (supply being cut off, breakdown, etc.).

Of course, from U.S. Pat. No. 7,080,565, a dynamic load bench is also known enabling to apply on the rotary shaft of the actuator to be tested radial stresses and dynamic torques. However, the controlled means for reproducing them also comprise too this end two distinct equipment independently the one from the other with specific sub-assemblies. It is in particular necessary to mechanically decouple the application of radial stresses and torques by means of sophisticated Cardan joint, slide, or jointed coupling systems. Furthermore, an encoder should be provided for measuring the rotation of the output shaft of the actuator. And the numerous present sub-assemblies and equipment furthermore limit the excitation of the bench at high frequencies able to generate prejudicial interference resonances and also result in a tricky implementation.

From patent EP 0,239,264, a trial apparatus is further known for applying a mere torque on co-linear input and output shafts of a transmission type gear box for an aircraft engine. To this end, it comprises more specifically a device for applying the torque to two parallel and symmetric modules relative to the shafts, and comprising multiple gear devices driven by rotary actuators so as to be able to reach the high power of the engine.

SUMMARY

The present method, system and device aim at solving the above mentioned problems and at providing a dynamic load bench, the implementation of the controlled reproduction means of which allows to apply safely, reliably and with no risks radial loads and variable torques being at least comparable to those met by the mechanism to be tested in actual conditions of use, so as to optimize the design and the setting of mechanisms such as rotary actuators.

To this end, the dynamic load bench intended for applying, on the rotary shaft of a mechanism to be tested, such as an actuator or the like, radial loads and variable torques provided by controlled reproduction means including two identical reproduction modules, arranged parallelly and symmetrically relative to said rotary shaft to be tested, is remarkable, according to the present method, system and device, in that each module comprises:

a torque motor with a driving shaft parallel to said shaft to be tested, said torque-motors of said two modules rotating in the same direction;

a torsional rod being coaxially integral, by one of its ends, with said driving shaft of the torque motor; and connecting rod-crank connection for connecting the other end of said torsional rod to said shaft to be tested in a plane perpendicular to the latter and to said driving shafts, so that, in said perpendicular plane, said connecting rods of the two modules are parallel and symmetrically offset by 180° with each other relative to the shaft to be tested and to their respective driving shafts by said cranks.

Thus, the modular implementation of the reproduction means as two identical and symmetrical modules relative to the shaft of the actuator with a kinematic structure by torque motor, torsional rod and connecting rod-crank connection allows to simultaneously apply radial loads and variable torques on the latter, as opposed to the prior art implementations requiring two different benches or two independent distinct equipment in one same bench. In such a design, it mechanically results therefrom a simpler and more reliable achievement of the bench and a larger operation dynamics without the problems being inherent from excitation frequencies.

Advantageously, said driving shaft of each torque motor is hollow and has a through axial passage inside which said torsional rod is integrated with one of its ends being integral with said hollow shaft and the other end going out of said hollow shaft and connected to said corresponding connecting rod-crank. By means of this coaxial arrangement of the torsional rod inside the driving shaft, les two modules have a significant compactness so that the mass of the bench is highly reduced, as opposed to the prior above mentioned implementation, where the torsional rod is an extension of the driving shaft of the engine.

In a preferred embodiment, said connecting rods are connected, on one side, to said rotary shaft to be tested by a double common crank mounted in its centre on said rotary shaft and carrying, at its diametrically opposed ends, said connecting rods respectively, and, on the other side, to said respective torsional rods by two identical simple cranks, mounted offset by 180° from each other on said torsional rods.

Thus, the two connecting rods, arranged symmetrically and perpendicularly to the rotary shaft of the mechanism to be tested (actuator) transmit (the one pushing, the other pulling) and apply to the latter the desired radial loads and variable torques, corresponding to the above mentioned radial stresses and hinge moments undergone by the shaft of the actuator of a control surface onto which significant aerodynamic forces apply.

Thanks to the two symmetrical modules, the connecting rods act as the opposite arms of a deformable parallelogram on the shaft of the actuator, in a plane perpendicular to the latter, reproducing in a simple and reliable way the stresses and torques applied on said shaft in the actual conditions of use.

Advantageously, said connecting rods are mounted on the respective cranks of said links by means of angular clearance jointed couplings, such as for example knee joints of the sphere type. Thus, with such an assembly, it is not necessary to provide for an accurate positioning between the actuator to be tested and the two modules thanks to the knee joints imparting a natural isostatic to the bench as a whole and compensate for the different functional plays and clearances.

In a particular embodiment, the distance between axes of said double crank separating the rotary shaft to be tested from each connecting rod is identical to the distance between axes of each simple crank separating said torsional rod from said corresponding connecting rod. Thus, said transmission connecting rods are arranged orthogonally to the rotary shaft of the actuator to be tested and to the driving shafts of the torque-motors.

For performance, reliability, low inertia and high volume and mass torque reasons, it is preferred that said torque motors of the modules are electric more specifically of the brushless type. Furthermore, complex hydraulic systems and expensive facilities (compressors, accumulators, . . . ) are avoided, to be provided with hydraulic torque motors.

Furthermore, said torsional rods are sized in torsion stiffness, the latter acting as calibrated torquemeters (the angular difference from one end to the other of the rod corresponding to a given transmitted torsion torque).

According to another characteristic, each module further comprises an angular position sensor of said driving shaft of the torque motor and an angular position sensor of said corresponding torsional rod, and said controlled means comprise an electronic slaving device for the angular position provided by each sensor of said torque motors as a function of the angular position of the rotary shaft of said mechanism to be tested, and an electronic power device connected to said electronic slaving device and supplying said torque motors.

Preferably, each one of the modules comprises electronic and/or mechanical means for limiting the angular clearance and speed of each torque motor. Thus, should the actuator be defective, its clearance is limited by that of the torque motors and the stiffness of the torsional rods, so that it is not damaged, compared to previous benches.

BRIEF DESCRIPTION OF THE FIGURES

The FIGS. of the appended drawing will better explain how the present method, system and device can be implemented. In these FIGS., like reference numerals relate to like components

DETAILED DESCRIPTION

Figure 1:
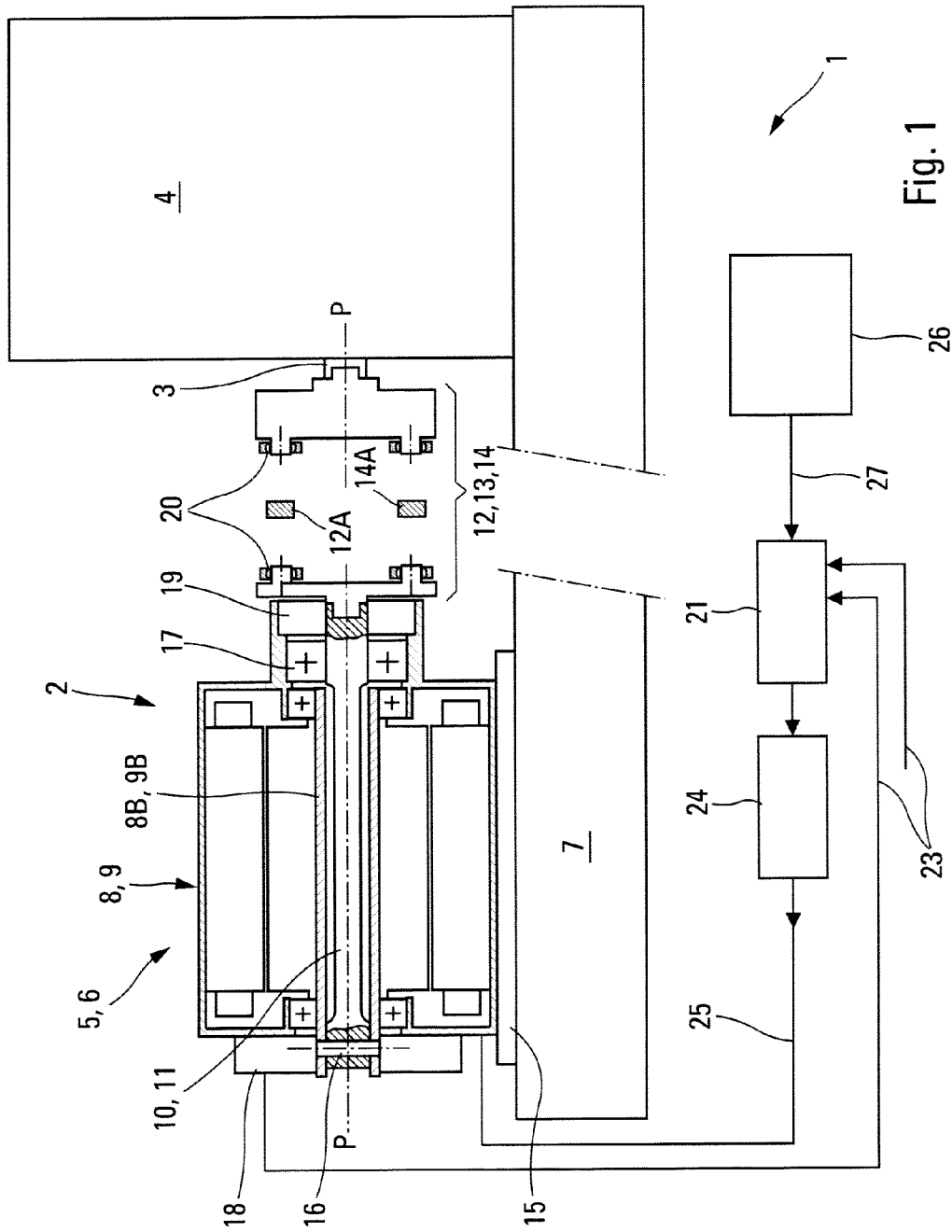
FIG. 1 is a schematic and partially sectional view of an embodiment of the dynamic load bench according to the present method, system and device.
Figure 2:
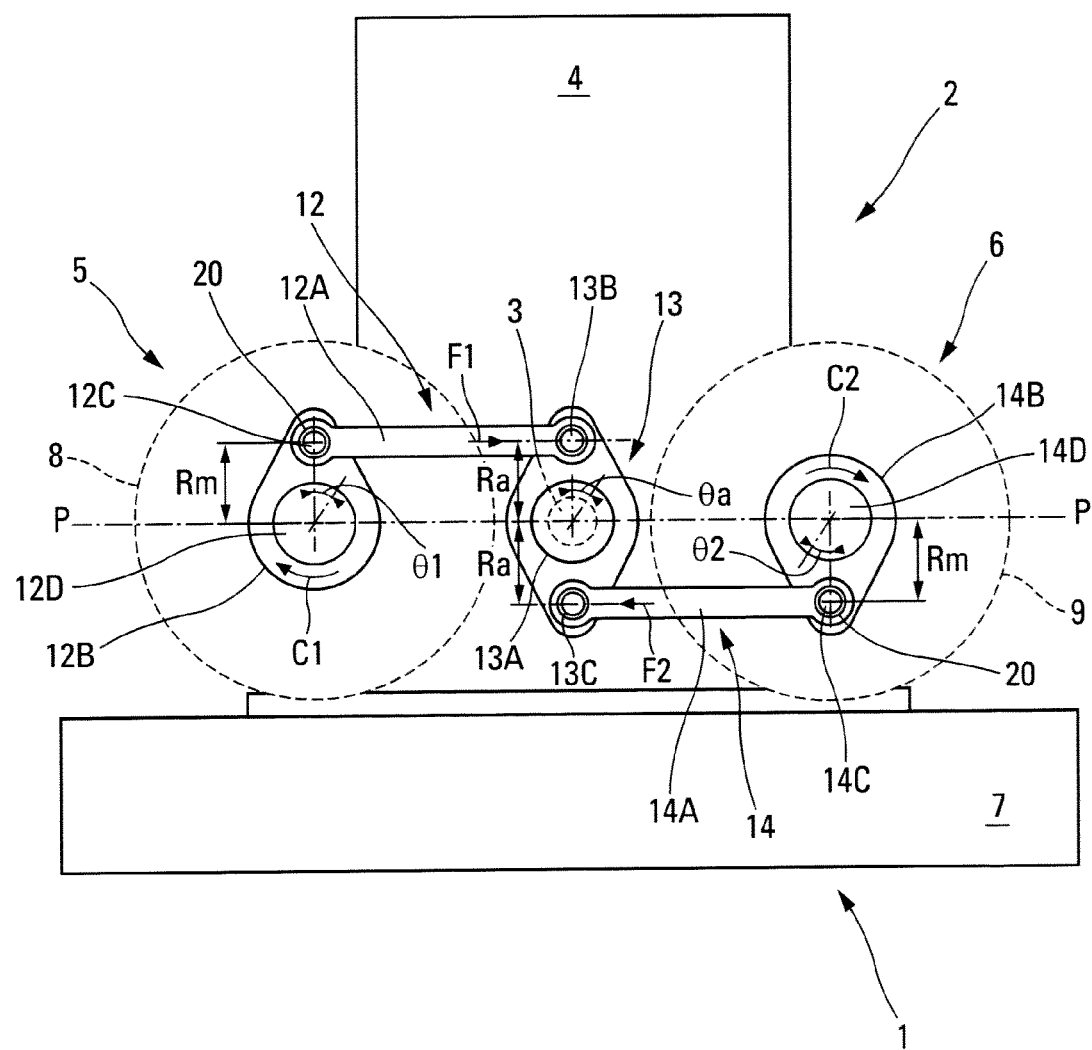
FIGS. 2 and 3 are schematic respectively side and top views of said dynamic load bench, illustrated on FIG. 1.
Figure 3:
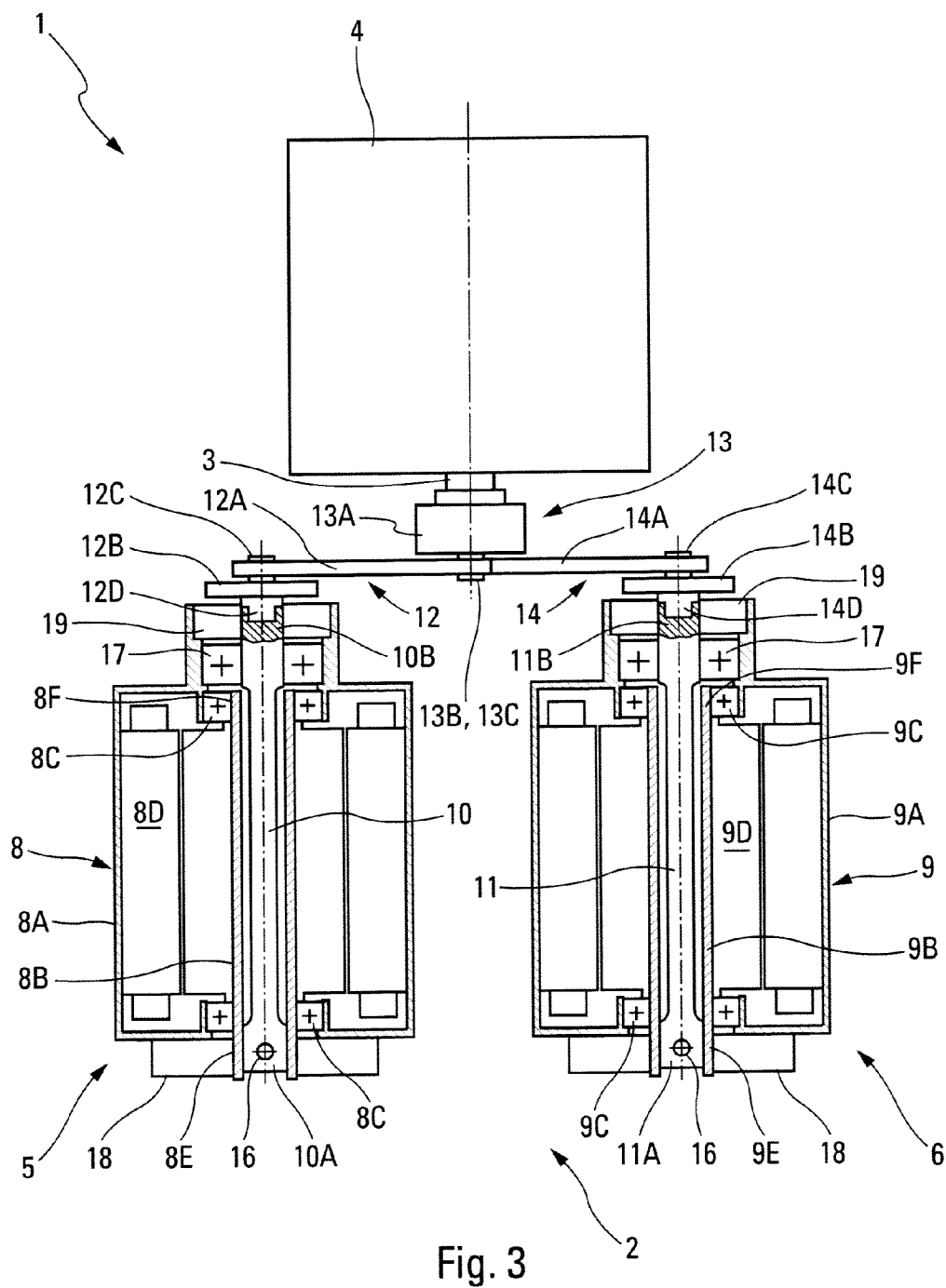

The dynamic load bench shown on FIGS. 1 to 3 comprises controlled means 2 for applying radial loads and variable torques on the rotary shaft 3 of a rotary bench to be tested 4. As been reported previously, the aim is to reproduce, as closely as possible, the constraints or biases applied on the shaft of the actuator onto which there is mounted the aerodynamic control surface, not shown, of a missile, as a result of sudden direction and speed changes of the latter and, thus, of the deflection of the control surface. And to thereby design structurally and operationally safe and reliable shaft actuators.

To this end, the controlled means 2 are defined by two modules for reproducing radial loads and variable torques 5 and 6, being identical and symmetrically arranged and parallel relative to the geometric axis of the shaft 3 of the actuator. Each module 5, 6 more specifically includes a torque motor 8, 9, a torsional rod 10, 11 and a connecting rod-crank connection 12, 13, 14 with the shaft 3 of the actuator 4.

Structurally, each torque motor 8, 9 comprises a cylindrical body 8A, 9A inside which there is rotatably mounted a driving shaft 8B, 9B by means of internal bearings 8C, 9C. In this example, the torque motors are preferably electric, of the brushless type for performance, reliability, low inertial, high torque reasons, . . . and the control in rotation of the driving shafts occurs by electric components (stator, rotor, . . . ) symbolized in 8D, 9D on FIG. 1 and housed in the cylindrical body 8A, 9A, around the corresponding shaft. Naturally any other type of torque motor, such as fluidic (hydraulic), could be used. Furthermore, the dynamic load bench 1 comprises a stiff, stable mechanical support 7 onto which are arranged the actuator to be tested 3 and, by means of a common base 15, the two torque motors 8, 9 by their cylindrical bodies.

Geometrically, it can be seen on FIGS. 1 to 3, that the parallel driving shafts 8B, 9B of the torque motors are respectively arranged symmetrically relative to the rotary shaft 3 of the actuator 4, the geometric axes of the driving shafts 8B, 9B and of the shaft to be tested 3 being contained in the same horizontal plane P.

The driving shaft 8B, 9B of each torque motor 8, 9 is advantageously hollow and receives inside the torsional rod 10, 11 being coaxial to its respective shaft and adapted for transmitting the torque imparted by the driving shaft to the shaft of the actuator via the connecting rod-crank connection. To this end, a first end 10A, 11A of each torsional rod is rigidly connected to a first end 8E, 9E of the hollow shaft with a fastening member 16, such as a pin or similar, providing the joint rotation of the shaft with the corresponding torsional rod. And the second end 10B, 11B of each one of them, facing the shaft of the actuator, axially opens up from the second end 8F, 9F of the driving shaft, with no connection with the latter, and is integral with the connecting rod-crank connection 12, 14. The second end 10B, 11B of each torsional rod is then carried by a bearing 17 housed in the cylindrical body. Identical torsional rods of the two modules are naturally sized in torsion stiffness.

Furthermore, it can be seen that the first ends 8E, 9E of the driving shafts (and thus those of the torsional rods) project relative to their corresponding bodies 8A, 9A and that they carry angular position sensors 18 for said shafts 8B, 9B (rotors of the brushless torque motors). This is similar for the second ends 10B, 11B of the torsional rods 10, 11, onto which there are mounted angular position sensors 19 being housed in the corresponding cylindrical bodies. The sensors 18, 19 to be used should be accurate so as to have broad pass band slaving loops and, for instance sensors of the resolver, encoder, potentiometer type or similar could be contemplated.

As far as the links between the torsional rods 10, 11 of the modules and the shaft 3 of the actuator 4 are concerned, they comprise two respective and parallel connecting rods 12A, 14A connected, on one side, through respective cranks 12B, 14B to the torsional rods 10, 11 and, on the other side, through a common double crank 13, to the shaft 3 of the actuator 4. The two connecting rods 12A, 14A are thereby arranged in a plane perpendicular to parallel geometric axes of the driving shafts 8B, 9B (and thus of the torsional rods) of the modules 5, 6 and of the shaft of the actuator, and are arranged symmetrically offset by 180° from each other relative to the shaft 3 of the actuator. It can be seen, on FIG. 1, that the connections 12, 13, 14 are illustrated in an exploded view for clarity reasons.

In particular, each simple crank 12B, 14B has, in the vicinity of its ends, two parallel crankpins 12C, 12D, 14C, 14D, bent at 90° and opposite relative to the arm or body of the crank, a first bent crankpin 12D, 14D of each crank being made coaxially integral with the second end 8F, 9F of the corresponding torsional rod, whereas the second bent crankpin 12C, 14C carries one of the ends of the connecting rod 12A, 14A.

It can be more specifically seen, on FIG. 2, that the simple cranks 12B, 14B are mounted offset by 180° from each other on the respective torsional rods 10, 11, so that, on this FIG., the crank 12B is directed upwards, whereas the crank 14B is directed downwards.

Furthermore, the common double crank 13 has, on one side, a central crankpin 13A coupled to the shaft 3 of the actuator (for example radial studs, not shown, make integral in rotation the shaft with the central crankpin) and, on the other side, two diametrically opposed end crankpins 13B, 13C relative to the central crankpin 13A and onto which there are respectively mounted the second ends of the connecting rods 12A, 14A.

Furthermore, between the ends of the two connecting rods 12A, 14A and their respective crankpins 12C, 14C, 13B, 13C of the cranks 12B, 14B, 13 there could be provided angular clearance jointed couplings 20, such as knee sphere joints or elastic joints.

It can also be seen in the view illustrated on FIG. 2, that the distance Ra separating each opposite crankpin 13B, 13C from the central crankpin 13A of the double crank 13 is equal to the distance Rm separating the first two crankpins 12D, 14D from the second two crankpins 12C, 14C of the simple cranks 12B, 14B, so that the two parallel connecting rods 12A, 14A are arranged horizontally on FIG. 2 and orthogonally to the shaft 3 of the actuator. Naturally, other ratios could be selected without impairing the operation of the bench, the two parallel connecting rods being then merely tilted relative to the horizontal.

These controlled reproduction means 2 of the radial loads and the torques by the two modules 5, 6 also comprise electronic devices. For example, as shown on FIG. 1, an electronic slaving device 21 enables to know the angular position of each of the two rotary torque motors, as a function of the angular position of the shaft of the actuator, from the two angular position sensors 18 connected by respective connections 23 to the slaving device. The torque to be applied could thus be regulated, knowing that the latter is proportional to the angular difference between the angular position of the torque motor and that of the actuator. On the output of the electronic slaving device 21 there is provided an electronic power device 24 for supplying for example the torque motors 8, 9 by a connection 25, limiting the torque to be provided and the maximum speed to values compatible with the possibilities of the actuator to be tested, preventing the latter from being damaged.

Naturally, a test electronics 26 is connected to the slaving device 21 by a connection 27 and more specifically includes specific programs for each type of actuators to be tested as a function of applications, missions, constraints, dimensions, etc.

Because of some functional freedom provided by the knee joints 20 of the connecting rod-crank connections, ensuring the compensation for plays, distances between axes and angular clearances and thereby imparting the isostatic of the bench, an accurate positioning between the torque motors 8, 9 and the actuator 4 is not necessary. On the other hand, the angular position sensors 18 of the two torque motors allow the rotation angle of the rotary shaft 3 of the actuator 4 to be tested to be determined even in presence of a deflection (arrow) introduced by the application of the radial load provided by the corresponding connecting rod (and representative of the action of the aerodynamic loads applied on the control surface of the missile and, thus, on the shaft of the actuator).

The rotation angle θa of the output shaft and the deflection Ya of the latter could be determined by the following formulae (FIG. 2):

$$\theta a = Rm/Ra \cdot (\theta 1 + \theta 2)/2$$

and $$Ya = Rm \cdot (\theta 1 - \theta 2)/2$$

where Rm=lever arm of the connecting rod-torque motor crank
Ra=lever arm of the connecting rod-actuator crank
θ1, θ2=rotation angles of the output shafts of the torque motors.

Managing the radial stress and the torque generated by the reproduction means 2 of the present method, system and device is achieved by means of the calibrated stiffness of each torsional rod 10.11 acting as a sensor of the torque or the calibrated torquemeter according to the calibrated stiffness (the angular difference between the torsion angle at its end with the driving shaft and the torsion angle at its end with the connecting rod giving, for a given stiffness, a determined torque).

Assuming a radial stress Fr and a torque C to be applied on the shaft 3 of the actuator to be tested. Each one of the two then supplied torque motors 8, 9 generates a torque C1 and C2 and applies on the connecting rods 12A and 14A, via the rods 10 and 11, a radial stress F1 and F2.

Via the usual mechanics relationships, this gives:

$$F1 = C1/Rm \text{ and } F2 = C2/Rm (Rm: \text{see above})$$

$$C = (F1 + F2) \cdot Ra (Ra: \text{see above})$$

$$Fr = F1 + F2$$

from where the stresses and the torques to be controlled to the two torque motors are extracted:

$$F1 = (C/Ra + Fr)/2 \text{ and } F2 = (C/Ra - Fr)/2$$

$$C1 = Rm \cdot (C/Ra + Fr)/2$$

$$C2 = Rm \cdot (C/Ra - Fr)/2$$

From there, the torques C1 and C2 on the two torque motors are provided as follows.

It is known that the angular position θa of the shaft of the actuator is known in real time through calculation from information from the angular sensors 18, 19 sent in the slaving device 21 (see calculation of θa above). Each torque motor is slaved in position by its sensor and the electronic slaving 21 and power 24 devices.

Of course, the pass band of the slaving is higher than that of the actuator 4 to be tested so as to provide a suitable follow-up with a negligible phase displacement and attenuation, without distortion of signals. To this end, a pass band at least twice higher is used.

Furthermore, another advantage of the slaving in position of each torque motor is that the variations of interference torque are rejected (notch torque or cogging torque), as well as the dry and viscous frictions (rollings, hysteresis torques).

The angular position θco (θ1, θ2) instructed to the torque motor 8, 9 is a function of the desired torque profile C1 (or C2). This torque profile is determined before the trials so as to do what it has been decided to reproduce on the shaft of the actuator (a torque with an angle of) x°. It is known that each instant, such a torque with such a radial stress will be achieved. For instance, for a torque to simulate with the shape C1=Kθa+CO, where K is an aerodynamic stiffness (depending on the flight point, the altitude, the speed, . . . ), Ga is the angular position of the shaft of the actuator and CO is an independent constant torque of Ga, and assuming that the stiffness of the torsional rod is equal to KO, an angle θco such as will be instructed:

$$KO(\theta - \theta a) = K\theta a + CO$$

i.e θco=(K/KO+1)θa+CO/KO assuming θ substantially equal to θco.

That is, the function of transfer connecting θ to θco resulting from the slaving in position of the torque motor will be as follows:

$$\theta/\theta co = 1/(1 + a \cdot p + b \cdot p^2 + c \cdot p^3) \text{ with:}$$

$b = 1/\omega O^2$
$a = 2\xi/\omega O$
$c/b \ll 1/\omega O$
p=Laplace operator
The cut off pulse ωO is selected so as to be approximately twice as high than that of the actuator.
ξ=damping of the approximated function of transfer of the second order.

In order to improve the control dynamics of the torque, it is preferred to carry out a phase advance filtered on θco.

For instance, the angles θ1 and θ2 of the torque motors 8, 9 could cover an angular range of about 20-25°. During a trial, these angles θ1 and θ2 as well as the angle θa of the rotary shaft 3 of the actuator 4 are naturally very close to each other, but somewhat different, because of the deflection Ya of the rotary shaft under the action of the radial loads issued from the connecting rods.

It is also to be furthermore noticed that each module comprises electronic and mechanical means (not shown on the FIGS.) for limiting the angular clearance and speed of the torque motors so as to protect the actuator and accordingly make the bench reliable and secured.

Thus, in addition to components of the bench being quickly assembled and dismantled because of the modularity of the latter and the lack of interaction between said components, such a dynamic bench provides for an easier implementation of the actuators, a validation and justification of specifications relative to operational needs (torque/speed, acceleration, stiffness, . . . ), a reliable evaluation of the specified operation flight profile and a more realistic qualification and certification of the actuator.

The invention claimed is:

1. A dynamic load bench adapted for applying radial loads and variable torques on a rotary shaft of a mechanism to be tested, said dynamic load bench comprising two identical reproduction modules arranged generally parallel and generally symmetrical relative to said rotary shaft to be tested, wherein each module comprises:
a torque motor with a driving shaft parallel to said shaft to be tested and rotatable in a first direction;
a torsional rod coaxially positioned with said driving shaft of the torque motor, said torsional rod comprising two ends; and
a connecting rod and a crank connecting one of the ends of the torsional rod to said shaft to be tested, said connecting rod defining a plane generally perpendicular to an axis defined by said shaft to be tested and to said driving shaft of said torque motor so that, in said plane, said connecting rods of the two modules are parallel and symmetrically offset from each other relative to the shaft to be tested.

2. The bench according to claim 1, wherein said driving shaft of each torque motor is hollow and has a through axial passage inside which said torsional rod is integrated with one of its ends integral with said hollow shaft and the other end going out of said hollow shaft and connected to said corresponding connecting rod.

3. The bench according to claim 1, wherein said connecting rods are connected, on one side, to said rotary shaft to be tested by a double common crank mounted on its center on said rotary shaft and carrying, at its diametrically opposed ends relative to its center, said connecting rods respectively and, on the other side, to said respective torsional rods by two simple identical cranks mounted offset by 180° from each other on said torsional rods.

4. The bench according to claim 3, wherein said connecting rods are mounted on the respective cranks of said connections by angular clearance jointed couplings.

5. The bench according to claim 4, wherein said angular clearance jointed couplings are of the spherical knee type.

6. The bench according to claim 3, wherein the distance between axes of said double crank separating the rotary shaft to be tested from each connecting rod is identical to the distance between axes of each simple crank separating said torsional rod from said corresponding connecting rod.

7. The bench according to claim 1, wherein said torque motors of the modules are of a brushless type electric motor.

8. The bench according to claim 1, wherein said torsional rods are calibrated in torsion stiffness.

9. The bench according to claim 1, wherein each module further comprises an angular position sensor of said driving shaft of the torque motor and an angular position sensor of said corresponding torsional rod.

10. The bench according to claim 1, wherein each of the modules comprises electronic and/or mechanical means for limiting the angular clearance and speed of each torque motor.

11. The bench according to claim 9, further comprising controlled means for the angular position provided by each sensor of said torque motors as a function of the angular position of the rotary shaft of said device to be tested and an electronic power device connected to said slaving device and supplying said torque motors.

12. A dynamic load bench adapted for applying radial loads and variable torques on a rotary shaft of a mechanism to be tested, said dynamic load bench comprising a first reproduction module and a second reproduction module, each with a housing being spaced from the other, and wherein each module comprises:
 a torque motor with a driving shaft positioned to be parallel to said shaft to be tested, said torque motor of rotatable in a first direction;
 a torsional rod coaxially positioned with said driving shaft of the torque motor; and
 a crank having an input end rotatably coupled to said torsional rod for rotating by said torsional shaft and an output end coupled to a connecting rod; said connecting rod movable by said crank along a generally vertical plane, which is generally perpendicular to an axis defined by a rotary shaft to be tested and an axis of the driving shaft;
 wherein the output end of the crank connected to the first reproduction module is positioned at 180° offset relative to the output end of the crank connected to the second reproduction module.

13. The bench according to claim 12, wherein said connecting rod of said first module is parallel to said connecting rod of said second module.

14. The bench according to claim 13, wherein said two connecting rods are spaced from one another by a distance approximately twice that of either crank.

15. The bench according to claim 12, wherein said driving shaft of each torque motor is hollow and has a through axial passage inside which said torsional rod is integrated with one of its ends integral with said hollow shaft.

16. The bench according to claim 1, wherein said connecting rods are connected, on one side, to said rotary shaft to be tested by a double common crank mounted on its center on said rotary shaft and carrying, at its diametrically opposed ends relative to its center, said connecting rods respectively and, on the other side, to said respective torsional rods by two simple identical cranks.

17. The bench according to claim 16, wherein said connecting rods are mounted on the respective cranks of said connections by angular clearance jointed couplings.

18. The bench according to claim 17, wherein said angular clearance jointed couplings are of the spherical knee type.

19. The bench according to claim 12, wherein said torque motors of the modules are of a brushless type electric motor.

20. The bench according to claim 12, wherein said torsional rods are calibrated in torsion stiffness.

* * * * *